(12) United States Patent
Chepla et al.

(10) Patent No.: US 9,415,716 B2
(45) Date of Patent: Aug. 16, 2016

(54) CONNECTOR HAVING MULTIPLE DIRECTION CONNECTIVITY

(71) Applicant: WINSTON PRODUCTS LLC, Cleveland, OH (US)

(72) Inventors: Ryan William Chepla, Shaker Heights, OH (US); Winston Breeden, III, Chagrin Falls, OH (US)

(73) Assignee: WINSTON PRODUCTS LLC, Cleveland, OH (US)

( * ) Notice: Subject to any disclaimer, the term of this patent is extended or adjusted under 35 U.S.C. 154(b) by 0 days.

(21) Appl. No.: 14/484,354

(22) Filed: Sep. 12, 2014

(65) Prior Publication Data

US 2015/0067994 A1  Mar. 12, 2015

Related U.S. Application Data

(60) Provisional application No. 61/876,830, filed on Sep. 12, 2013.

(51) Int. Cl.
*F16B 5/00* (2006.01)
*B60P 7/06* (2006.01)
*B60P 7/08* (2006.01)

(52) U.S. Cl.
CPC ................ *B60P 7/06* (2013.01); *B60P 7/0815* (2013.01); *Y10T 24/4588* (2015.01)

(58) Field of Classification Search
CPC ....... B60P 7/06; B60P 7/0815; B61D 45/001; Y10T 24/4588
USPC .................................................... 410/102, 115
See application file for complete search history.

(56) References Cited

U.S. PATENT DOCUMENTS

| | | | | |
|---|---|---|---|---|
| 2,856,866 A * | 10/1958 | Hall | ...................... | B60P 7/0815 410/102 |
| 3,796,404 A * | 3/1974 | Shields | ................. | B60P 7/0807 410/55 |
| 5,700,118 A * | 12/1997 | Bennett | ..................... | B60P 7/15 296/181.3 |
| 5,941,667 A | 8/1999 | Hardison | | |
| 6,106,205 A | 8/2000 | Haire | | |
| 6,675,980 B2 | 1/2004 | Ehrgott | | |
| 2005/0238455 A1* | 10/2005 | Toteff | ..................... | B60P 3/077 410/104 |
| 2006/0239789 A1* | 10/2006 | Beals | .................... | B60P 7/0815 410/34 |
| 2014/0374564 A1* | 12/2014 | Schroeder | ............. | B60P 7/0815 248/503 |

* cited by examiner

*Primary Examiner* — Robert J Sandy
*Assistant Examiner* — Louis Mercado
(74) *Attorney, Agent, or Firm* — Cooper Legal Group LLC

(57) ABSTRACT

A connector has at least one aperture for receiving a buckle clip. The aperture has two crossed aperture extent portions. Each aperture extent portion has a different orientation such that the buckle clip received within the at least one aperture can be at one of two different orientations.

14 Claims, 4 Drawing Sheets

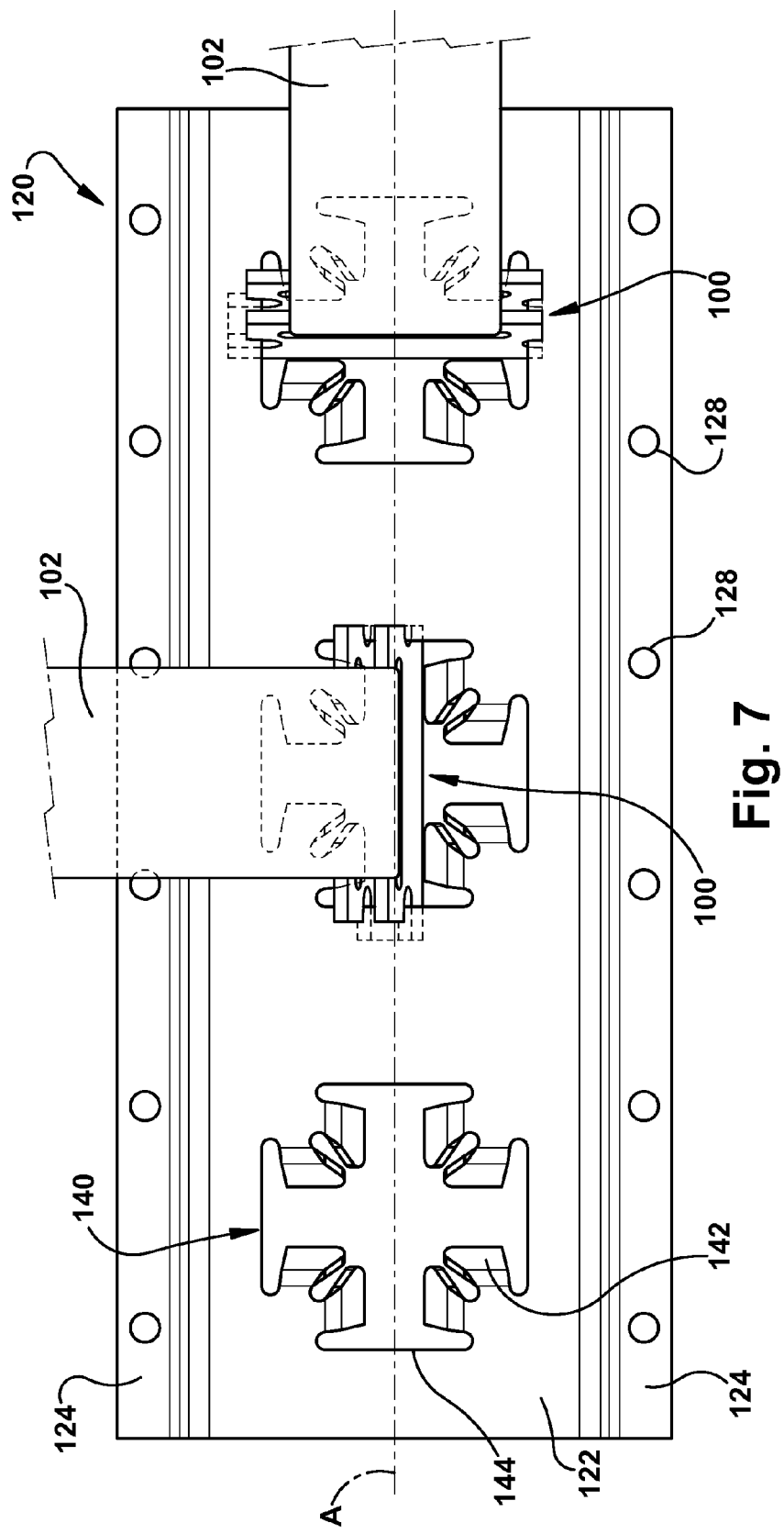

CONNECTOR HAVING MULTIPLE DIRECTION CONNECTIVITY

RELATED APPLICATIONS

This application claims the benefit of U.S. Provisional Application No. 61/876,830, filed on Sep. 12, 2013, the entire disclosure of which is incorporated by reference.

TECHNICAL FIELD

The present invention relates generally to connectors for securing objects, such as cargo, via flexible strapping and specifically relates to a connector type referred to as "E-Track Connectors."

BACKGROUND

Connectors, commonly referred to as "E-Track Connectors" are used in various applications, such as in the transportation industry, to secure flexible strapping (e.g., webs, belts or the like) to load rails or tracks (e.g., commonly referred to as E-Track) mounted on a transporting surface (e.g., a side, floor or ceiling of a container, truck hold, load bed, dolly, or other cargo areas). In one specific use, the strapping or straps are used for holding one or more objects in partially loaded containers or areas so that they will not shift (e.g., within the container or area) and cause damage by either striking (e.g., against sides of a container or other items) or other loss. Such connectors are commonly used for trucks, railroad cars, airplanes and shipping containers. In one example, the load rails include a sequence of lock-down apertures.

Each lock-down aperture is capable of accepting an industry standard complementary buckle or clip. The buckle or clip is connected/connectable to the strapping or straps. The straps can be secured (e.g., wrapped over and around) cargo) in any desired or needed fashion. The buckle or clip is then secured to a desired/appropriate aperture point of a load rail. The straps can then be tightened (e.g., via ratchet, winch, turn buckle, etc.).

It is also possible to have a load rail with just a single aperture. Such a single aperture load rail is typically placed at a strategic location so that the otherwise need to select a desired/appropriate aperture point is a non-issue.

Load rails, albeit containing multiple or single aperture point(s) all have apertures that are generally rectangular, and thus have a major, elongate opening dimension and a minor, smaller opening dimension. The buckle or clip has commentary dimensions so that the buckle or clip interfaces with the respective aperture point in a single orientation. Within a load rail with plural apertures, all of the apertures are oriented in the same direction. Thus, for a load rail with plural apertures, the load rail is mounted with the entirety of the apertures arranged in an orientation direction/line (e.g., left-right, fore-aft, vertical, horizontal). Similarly, a load rail with single aperture, once mounted and thus fixed in place has a certain, single orientation direction. Accordingly, the buckle or clip that mates with the load rail must conform to the orientation direction of the aperture(s) in the load rail.

For some locations/applications, the multiple load rails are used to allow different orientation (e.g., horizontal and vertical). Further for some applications, multiple connector anchors are used that have different aperture orientation. These various applications add material and labor cost to install additional connector anchors.

Thus, it is desired to provide an improved connector anchor that does not suffer from these and other disadvantages.

BRIEF SUMMARY

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

According to one aspect, a connector has at least one aperture for receiving a buckle clip. The aperture has two crossed aperture extent portions. Each aperture extent portion has a different orientation such that the buckle clip received within the at least one aperture can be at one of two different orientations.

According to another aspect, a connector anchor has an axis and an aperture for receiving a buckle clip. The aperture has a first extent portion extending in a first direction. The aperture has a second extent portion extending from the first extent portion in a second direction transverse to the first direction. The first direction extends substantially parallel to the axis.

According to yet another aspect, a connector anchor has a longitudinal axis and at least two spaced apart apertures each of which may receive a buckle clip. Each of the apertures has a first extent portion and a second extent portion. The first extent portion of each of the apertures extends in a direction along the longitudinal axis of the connector anchor.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 7 is a plan view of the connector anchor illustrating the different orientations that buckle clips may be received in the connector anchor and straps may extend from the connector anchor.

DETAILED DESCRIPTION

Figure 1:
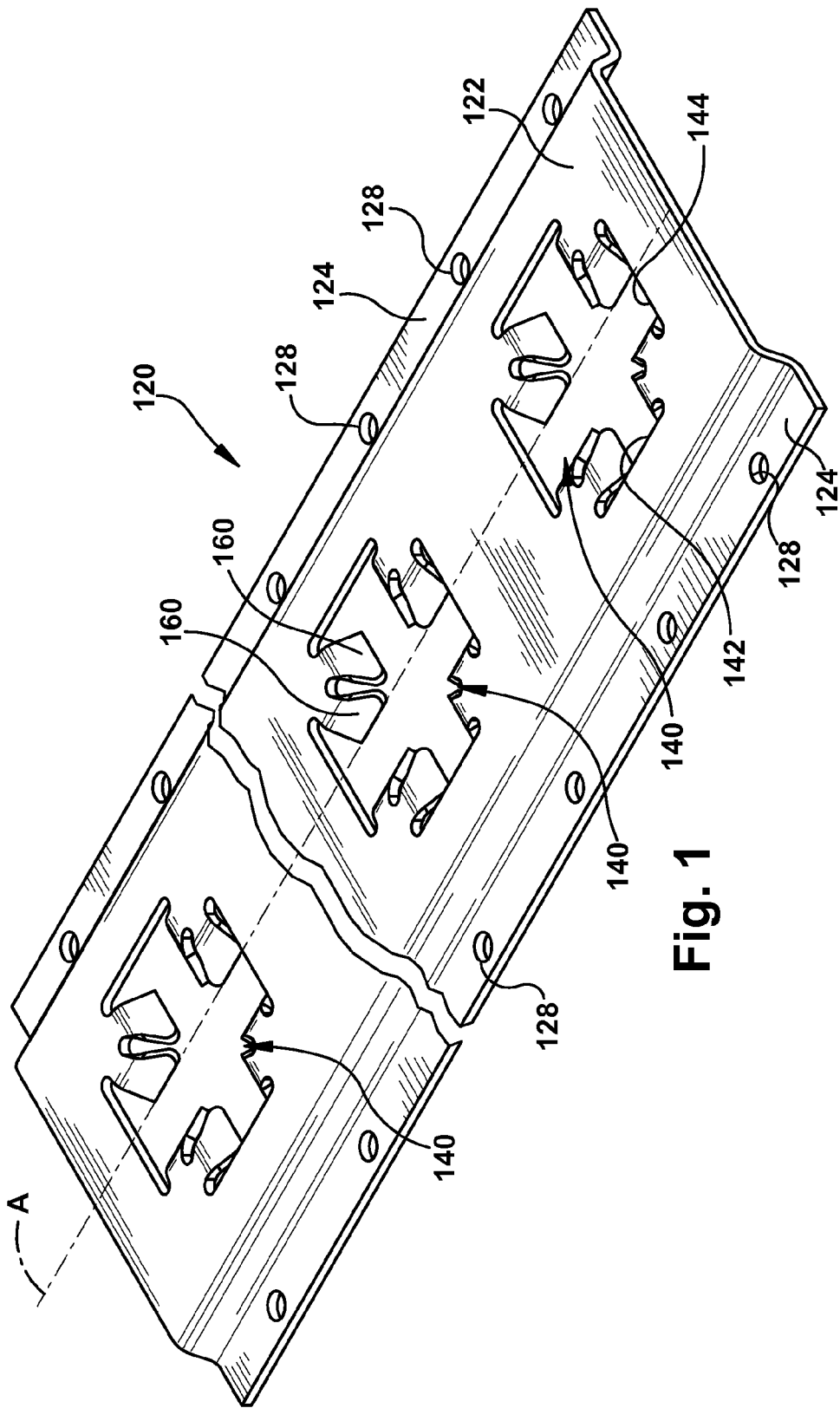
FIG. 1 is a perspective view of a connector anchor, according to one aspect.

An example embodiment that incorporates one or more aspects of the present invention is described and illustrated in the drawings. The illustrated example is not intended to be a limitation on the present invention. It will be understood that one or more aspects of the present invention can be utilized in other embodiments and other types of devices. Moreover, certain terminology is used herein for convenience only and is not to be taken as a limitation. Still further, in the drawings, the same reference numerals are employed for designating the same elements.

Figure 2:
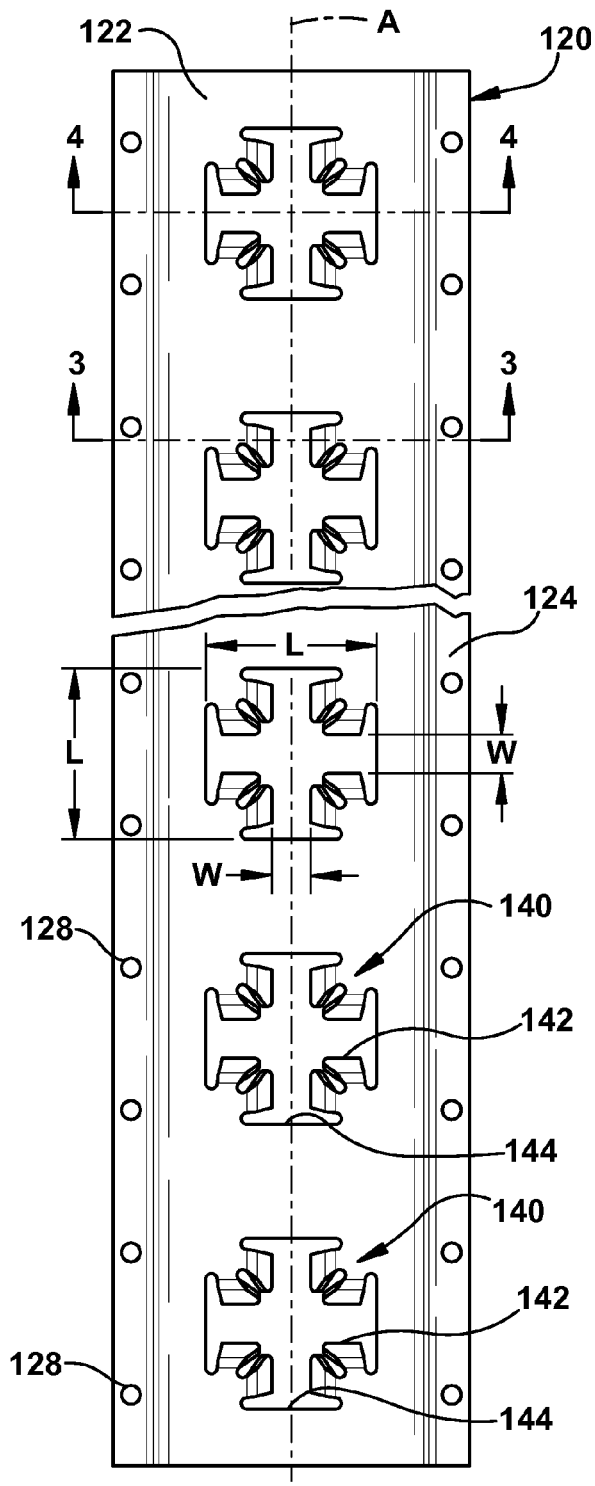
FIG. 2 is a plan view of the connector anchor illustrated in FIG. 1.

An example track or connector anchor 120, according to one aspect, is illustrated in FIGS. 1-2. The connector anchor 120 is intended for use on interior walls, ceilings and floors of box trucks, trailers and containers that store and transport cargo. The connector anchor 120 is intended to receive and use known E-track style buckle clips 100 (FIGS. 5-7) to retain the cargo.

The connector anchors 120 are available in any number of suitable lengths. For example, the lengths of the connector anchors 120 can be 5', 4', 3', 2' or other lengths depending on the application that the connector anchors will be used in. The connector anchors 120 are secured to mounting structure M (FIGS. 5-6) on the interior of the box trucks, trailers and containers by suitable means. For example, fasteners 101 that extend though small round holes along the outside edges of the track. The connector anchors 120 may be mounted to the box trucks, trailers and containers in any suitable orientation, such as in horizontal and vertical directions. It will be apparent however, that the connector anchors 120 could be mounted at an angle relative to horizontal or vertical.

The connector anchor 120 (FIG. 1) is elongate and has a longitudinally extending axis A. The connector anchor 120 is made from any suitable material having sufficient strength for the intended purpose, such as a metal like steel or aluminum. The connector anchor 120 is typically formed by any suitable method, such as by rolling, extruding or stamping. The connector anchor 120 is typically provided with a galvanized or painted finish.

Figure 3:
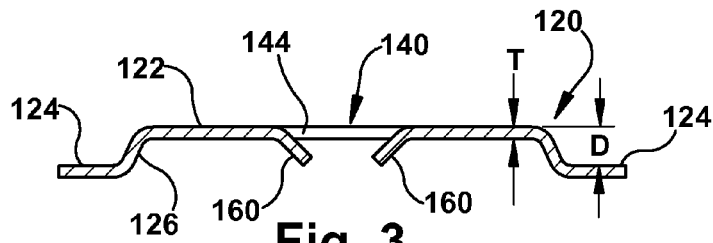
FIG. 3 is a cross-sectional view of the connector anchor illustrated in FIG. 2, taken approximately along line 3-3 in FIG. 2.
Figure 4:
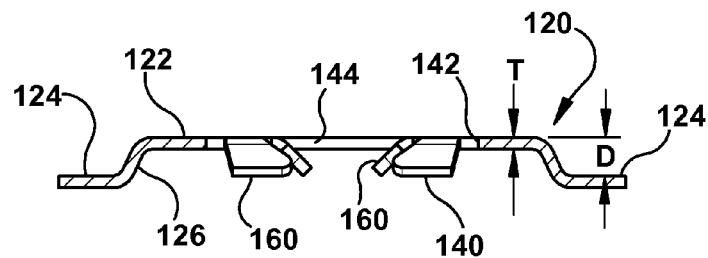
FIG. 4 is a cross-sectional view of the connector anchor illustrated in FIG. 2, taken approximately along line 4-4 in FIG. 2.

The connector anchor 120 includes a main mounting portion 122. The connector anchor 120 also has a pair of flanges 124 extending from opposite lateral sides of the main mounting portion 122. Each of the flanges 124 extends substantially parallel to and is offset from the plane containing the main mounting portion 122 by a distance D, as illustrated in FIGS. 3-4. Each of the flanges 124 is connected to the main mounting portion 122 by a respective connecting portion 126.

Figure 5:
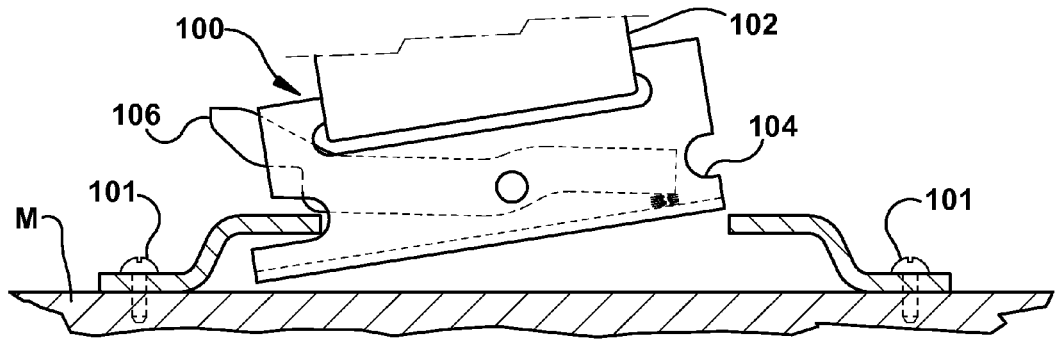
FIG. 5 is an enlarged cross-sectional view of the connector anchor illustrating a buckle clip being inserted into an aperture of the connector anchor.
Figure 6:
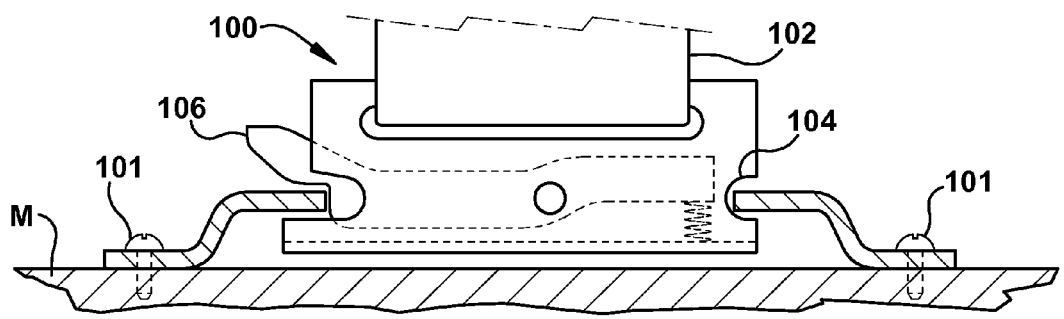
FIG. 6 is an enlarged cross-sectional view of the connector anchor, similar to FIG. 5, illustrating a buckle clip inserted into the aperture of the connector anchor in a retained position.

The connector anchor 120 is secured by suitable fasteners 101, such as screws, nails or the like as illustrated in FIGS. 5-6, to mounting structure M of the transporting vehicle, such as a floor, ceiling or wall. The fasteners 101 extend through openings 128 formed in the flanges 124. Each of the flanges 124 has multiple openings 128 spaced along the longitudinal extent of the flange.

The connector anchor 120 (FIGS. 1-2), according to at least one aspect, has at least one aperture 140 for receiving a buckle clip 100. In the illustrated aspect, the connector anchor 120 has several apertures 140. However, it will be apparent that any number of apertures 140, including just a single aperture, could be provided in the connector anchor 120. It will be apparent that any size of aperture 140 could be provided that is appropriate for the length of the connector anchor 120 and the intended size of the buckle clip 100 to be used.

The aperture 140 is defined by a pair of aperture extents 142, 144 that form an X or cross shape. The aperture extents 142, 144 are of similar rectangular size. Each of the aperture extents 142, 144 is configured as a rectangular shape and suitable size to receive a known buckle clip. The aperture extents 142, 144 intersect or are connected to one another at their respective center regions. Each aperture extent 142, 144 is configured so as to be engagable by the buckle clip 100.

The aperture extents 142, 144, are arranged so they extend in a relative orthogonal orientation pattern. Thus, when the buckle clip 100 is to be connected within the aperture 140, the orientation of the aperture extent 142, 144 used can be selected from two different orientations, as illustrated in FIG. 7. Different orientations of the buckle clip 100 may be required or convenient by the desired orientation of the cargo securing strap 102. Orientation of the buckle clip 100 may be more important than the length of the strap 102, webbing, rope or chain to which the buckle clip 100 is attached. The needed orientation of the buckle clip 100 and length of strap 102, webbing, rope or chain, of course, depends on the requirements of the cargo being transported.

Each of the aperture extents 142, 144 has a length L (FIG. 2) and a width W extending perpendicular to the length. The orientation of each aperture extent 142 and its associated length L extends transversely, and preferably orthogonally or perpendicularly, relative to axis A of the connector anchor 120. While the length L of the aperture extent 142 is illustrated as extending perpendicular to the axis A, it will be apparent that the orientation of aperture extent 142 can be oriented at any desired angle relative to the axis A of the connector anchor 120.

The length L of each of the aperture extents 144 preferably extends in a direction substantially along or parallel to the axis A of the connector anchor 120. While the associated length L of the aperture extent 144 is illustrated as preferably extending parallel to the axis A, it will be apparent that the orientation of the length of the aperture extent 144 can be oriented at any desired angle relative to the axis A of the connector anchor 120.

In the illustrated example, the relative orientations are such that the aperture extents 142, 144 extend substantially perpendicular (e.g., at or near 90°) relative to each other. It is contemplated that different relative orientations (e.g., different that 90°) between the aperture extents 142, 144 are possible.

Each aperture 140 has two crossed aperture extents 142, 144. Specifically, each aperture extent 142, 144 is elongated with the length L being greater than the width W. Each aperture extent 142, 144 is generally sized, configured, etc. similar to a single aperture that would be present within the known E-track style connectors so the known buckle clips 100 can be used. Also, although not required, each aperture extent 142, 144 may have straight (as illustrated), arcuate, tapered surface segments defining the aperture extents so as to effectively be engagable by a buckle clip.

Each aperture extent 142, 144 has a different orientation such that the buckle clip received within the at least one aperture can be at each of two different orientations. The apertures 140 of the connector anchors 120 are shown as cross or X shape in the illustrated aspect. However it will be apparent that in L-shape, V-shape or T-shaped configuration could equally be employed without departing from the spirit and scope of the illustrated aspect.

The connector anchor 120 has an overall average thickness T (FIGS. 3-4). Another feature of the connector anchor 120 is that the tabs 160 that define the aperture extents 142, 144 of the aperture 140 that are displaced outside of the thickness T of the mounting portion 122 of the connector anchor. That is, the tabs 160 defining at least some of each aperture 142, 144 extend outside of the dimensional thickness T of the mounting portion 122 of the connector anchor 120. However, in one example, the displaced material from a manufacturing operation forming the tabs 160 does not extend beyond the depth D of the cavity formed in the bottom of the connector anchor 120, as viewed in FIGS. 5 and 6. This feature of the portions 160 provides additional strength to the connector anchor 120 adjacent an aperture extent 142 or 144. This feature enables the buckle clip to be inserted into and engage an aperture extent 142 or 144 with minimal effort during attachment to the connector anchor 120. This may be desirable in some applications. The tabs 160 are illustrated as extending at an angle of about 45° relative to a plane containing the mounting portion 122 of the connector anchor 120. It will be understood that the tabs 160 could extend any suitable angle.

As is known, the buckle clip 100 has a strap 102 (FIGS. 5-7), chain, cable, rope or other flexible securement structure attached for securing cargo. The buckle clip 100 has a base 104 with a notch. The buckle clip 100 also has a spring loaded clip member 106 with a notch opposite the notch in the base 104. The clip 104 is pivotable relative to the base 104 when manually retracted to temporarily decrease the extent or width of the buckle clip 100, as illustrated in FIG. 5. Once the buckle clip member 106 is in position within one of the aperture extents 142, 144 of one of the apertures 140 the spring clip member 106 is released. The buckle clip 100 is then releasably secured in the aperture 140, as illustrated in FIG. 6.

The strap 102 (e.g., the webbing, chain, cable, rope or other flexible securement structure) typically has a certain orientation as it extends from the cargo to the connector anchor 120. Thus, the strap 102, chain, cable, rope or other flexible securement structure extends in a direction so the selected aperture extent 142, 144 of the aperture 140 to provide relatively low twist and stress of the strap 102, webbing, cable, rope or chain.

FIG. 7 illustrates for example purposes, that the connector 120 has two different buckle clips 100 secured in apertures in the connector anchor 120 at two different orientations. The orientations are shown to be basically perpendicular (e.g., at or near 90°) to each other. It is contemplated that different orientations (e.g., different that 90°) are possible. Thus, FIG. 7 shows how known buckle clips 100 can connect with the connector anchor 120 in accordance with at least one aspect at different angles at the same time.

Some of example advantages of the connector anchor 120, according to one aspect, are that a single connector anchor, constructed according to at least one aspect, can provide multiple directions of attachment for multiple buckle clips 100/straps 102. Further, possibly fewer connector anchors 120 could be utilized for use on interior walls and floors of box trucks, trailers and containers that store and transport cargo because of greater functionality of each connector anchor. Also, it is to be appreciated that objects with or without webbing attached thereto could be utilized with the connection anchor. Some examples include hooks, board holders, etc. Also, certain orientations of such objects could be preferable (e.g., board holders may have a preferred orientation).

Each connector anchor 120 in accordance with at least one aspect can do the job of both of the previously known E-Tracks that consist of tracks with apertures extending only in the horizontal or vertical directions. Each connector anchor 120 has the ability to receive the standard E-track buckle clip 100 horizontally, vertically, or both at the same time along different parts of the connector anchor 120. Such multiple connecting orientations of the buckle clip 100 provides a user more options when securing cargo. The connector anchor 120 could be mounted and employed in a box trucks, trailers and containers without prior knowledge of which mounting direction (horizontal or vertical) would be best for their cargo securement needs. The orientation of the buckle clip 100 can also be changed as needed or desired after the initial connection and orientation is selected. Such flexibility provides for less concern, worry, and effort to the user.

The invention has been described with reference to the example aspects described above. Modifications and alterations will occur to others upon a reading and understanding of this specification. Examples incorporating one or more aspects of the invention are intended to include all such modifications and alterations insofar as they come within the scope of the appended claims.

What is claimed is:

1. A connector for receiving and retaining a buckle clip relative to a mounting structure of a cargo environment, the connector including:
   a main mounting portion extending in a plane;
   at least one flange configured for engagement with the mounting structure and configured for being secured to the mounting structure, the at least one flange being offset a distance from the main mounting portion and extending substantially parallel to the main mounting portion;
   at least one connecting portion extending between and interconnecting the main mounting portion to the at least one flange; the at least one flange extending transverse to the main mounting portion, and the main mounting portion, the at least one flange and the at least one connecting portion being configured to offset the main mounting portion from the mounting structure and to provide a buckle clip receiving space; and
   at least one aperture, located within the main mounting portion and open to the buckle clip receiving space, for receiving the buckle clip, the at least one aperture having first and second crossed aperture extent portions with each of the first and second aperture extent portions configured to have a length between two respective ends to receive the buckle clip between the two respective ends of the respective aperture extent portion and into the buckle clip receiving space, each respective end of the first and second aperture extent portions being offset from the at least one connection portion to permit a receipt of the buckle clip into the buckle clip receiving space, each aperture extent portion having a different orientation such that the buckle clip received within the at least one aperture can be at one of two different orientations.

2. The connector of claim 1 further including a second aperture having first and second crossed aperture extents, each aperture extent of the second aperture having a different orientation such that the buckle clip received within the second aperture can be at one of the two different orientations.

3. The connector of claim 1 wherein the connector is elongate and has a longitudinal axis and the first aperture extent portion extends in a direction substantially parallel to the axis of the connector.

4. The connector of claim 1 wherein the first aperture extent portion extends in a direction substantially perpendicular relative to the second aperture extent portion.

5. The connector of claim 1 wherein a tab defines at least a portion of the aperture, the tab extends from the mounting portion beyond a thickness of the mounting portion.

6. The connector of claim 5 wherein the tab extends from the mounting portion of the connector at an acute angle.

7. The connector of claim 5 wherein the tab extends from the mounting portion of the connector in a substantially perpendicular direction.

8. A connector anchor for receiving and retaining a buckle clip relative to a mounting structure of a cargo environment, the connector anchor including:
   a main mounting portion extending in a plane;
   at least one flange configured for engagement with the mounting structure and configured for being secured to the mounting structure, the at least one flange being offset a distance from the main mounting portion and extending substantially parallel to the main mounting portion; and
   at least one connecting portion extending between and interconnecting the main mounting portion to the at least one flange; the at least one flange extending transverse to the main mounting portion, and the main mounting portion, the at least one flange and the at least one connecting portion being configured to offset the main mounting portion from the mounting structure and to provide a buckle clip receiving space;
   the connector anchor having an axis and an aperture located on the main mounting portion for receiving a buckle clip, the aperture having a first extent portion extending in a first direction, the aperture having a second extent portion extending from the first extent portion in a second direction transverse to the first direction, the first direction extending substantially parallel to the axis, with each of the first and second extent portions configured to have a length between two respective ends to receive the buckle clip between the two respective ends of the respective extent portion and into the buckle clip receiving space, each respective end of the first and second extent portions being offset from the at least one connection portion to permit a receipt of the buckle clip into the buckle clip receiving space.

9. The connector anchor of claim 8 wherein the aperture has a tab defining at least a portion of the aperture, the tab extends from the mounting portion at an acute angle beyond a thickness of the mounting portion.

10. The connector anchor of claim 8 further including a second aperture, the second aperture having a first extent portion extending in the first direction, the aperture having a second extent portion extending in the second direction.

11. The connector anchor of claim 8 wherein the first direction is substantially perpendicular to the second direction.

12. A connector anchor for receiving and retaining a buckle clip relative to a mounting structure of a cargo environment, the connector anchor including:
   a main mounting portion extending in a plane;
   at least one flange configured for engagement with the mounting structure and configured for being secured to the mounting structure, the at least one flange being offset a distance from the main mounting portion and extending substantially parallel to the main mounting portion; and
   at least one connecting portion extending between and interconnecting the main mounting portion to the at least one flange; the at least one flange extending transverse to the main mounting portion, and the main mounting portion, the at least one flange and the at least one connecting portion being configured to offset the main mounting portion from the mounting structure and to provide a buckle clip receiving space;
   the connector anchor having a longitudinal axis and at least two spaced apart apertures, located on the main mounting portion, each of which may receive a buckle clip, each of the apertures having a first extent portion and a second extent portion, the first extent portion of each of the apertures extending in a direction along the longitudinal axis of the connector anchor, with each of the first and second extent portions configured to have a length between two respective ends to receive the buckle clip between the two respective ends of the respective extent portion and into the buckle clip receiving space, each respective end of the first and second extent portions being offset from the at least one connection portion to permit a receipt of the buckle clip into the buckle clip receiving space.

13. The connector anchor of claim 12 wherein each of the apertures has a tab defining at least a portion of a respective aperture, the tab extends from the mounting portion at an acute angle beyond a thickness of the mounting portion.

14. The connector anchor of claim 12 wherein the first extent portion extends transversely relative to the second extent portion.

* * * * *